(12) United States Patent
Sugano et al.

(10) Patent No.: US 11,964,828 B2
(45) Date of Patent: Apr. 23, 2024

(54) METHOD AND DEVICE FOR CONTROLLING WORKPIECE SUCTION-GRIPPING ACTIONS OF ROBOT

(71) Applicant: DENSO WAVE INCORPORATED, Aichi-pref. (JP)

(72) Inventors: Atsuko Sugano, Chita-gun (JP); Hiroshi Tsuzuki, Chita-gun (JP)

(73) Assignee: DENSO WAVE INCORPORATED, Aichi-pref. (JP)

( * ) Notice: Subject to any disclaimer, the term of this patent is extended or adjusted under 35 U.S.C. 154(b) by 0 days.

(21) Appl. No.: 17/349,443

(22) Filed: Jun. 16, 2021

(65) Prior Publication Data

US 2021/0387818 A1 Dec. 16, 2021

(30) Foreign Application Priority Data

Jun. 16, 2020 (JP) .................................. 2020-103775

(51) Int. Cl.
  *B65G 47/91* (2006.01)
(52) U.S. Cl.
  CPC .................................... *B65G 47/91* (2013.01)
(58) Field of Classification Search
  CPC .................................. B65G 47/91; B25J 15/06
  See application file for complete search history.

(56) References Cited

U.S. PATENT DOCUMENTS

| | | | | |
|---|---|---|---|---|
| 4,699,559 A | * | 10/1987 | Bibbo | B65G 47/91 198/428 |
| 7,017,961 B1 | * | 3/2006 | Parnell | B25J 15/0616 294/2 |
| 9,205,558 B1 | * | 12/2015 | Zevenbergen | B25J 15/0052 |
| 2013/0127192 A1 | | 5/2013 | Regan et al. | |
| 2019/0389082 A1 | | 12/2019 | Higo | |

FOREIGN PATENT DOCUMENTS

| | | |
|---|---|---|
| DE | 10224598 C1 | 7/2003 |
| DE | 202007015153 U1 | 3/2009 |
| EP | 3871844 A1 | 9/2021 |
| JP | H10-193291 A | 7/1998 |
| JP | 2019-000922 A | 1/2019 |

\* cited by examiner

*Primary Examiner* — Ronald P Jarrett
(74) *Attorney, Agent, or Firm* — Oliff PLC

(57) ABSTRACT

To provide a method of controlling a robot and a suction gripping device capable of preventing occurrence of wrinkling in a workpiece having a thin packaging material with a content contained therein. A method of controlling an industrial robot according to an embodiment, configured to suction and grip a workpiece having a thin packaging material with a content contained therein, includes: pressing a suction pad against the content with the packaging material interposed therebetween and, upon starting the suction, suction-gripping the workpiece by the suction pad. Starting suction may be performed in a state in which the suction pad is pressed to the content with the packing material therebetween or before the suction pad is pressed to the content.

7 Claims, 10 Drawing Sheets

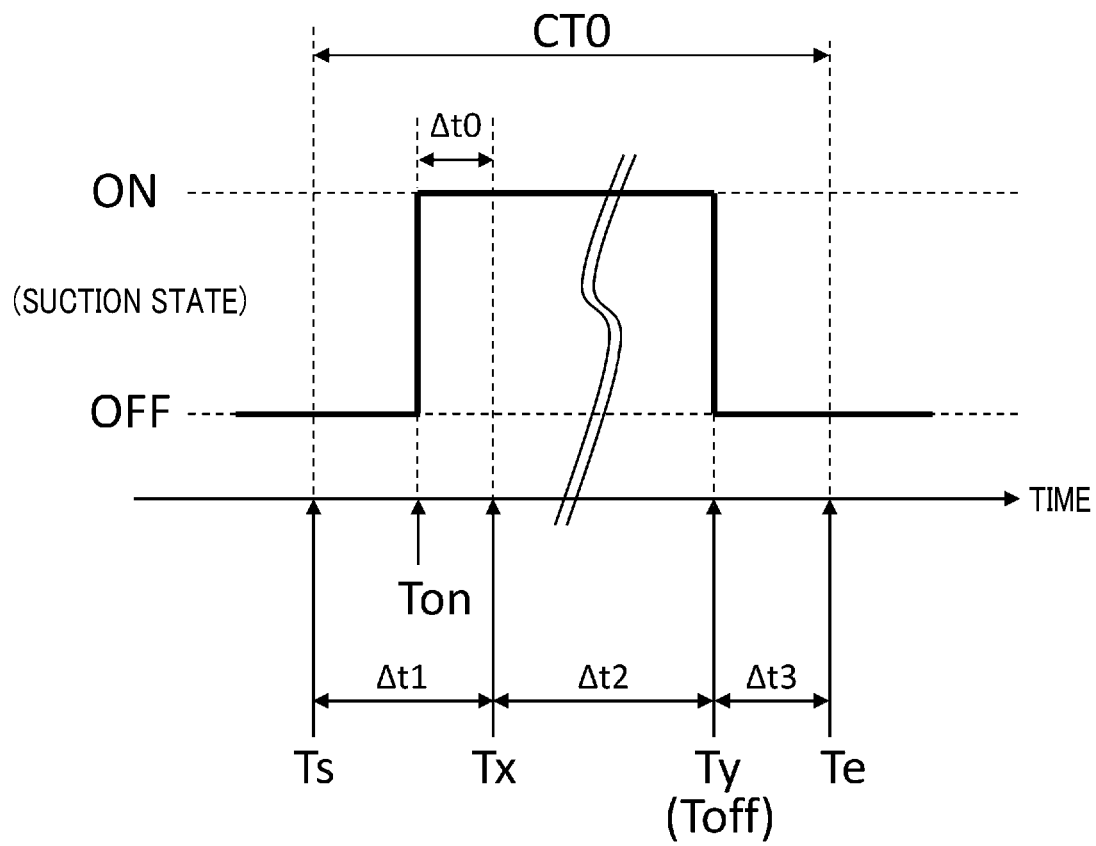

METHOD AND DEVICE FOR CONTROLLING WORKPIECE SUCTION-GRIPPING ACTIONS OF ROBOT

CROSS-REFERENCE TO RELATED APPLICATION

This application is based on and claims the benefit of priority from earlier Japanese Patent Application No. 2020-103775 filed Jun. 16, 2020, the description of which is incorporated herein by reference.

BACKGROUND

Technical Field

The present invention relates to a method and device for controlling workpiece suction and gripping actions of a robot, and in particular, to the method and device for controlling actions of an industrial robot which suctions and grips a workpiece having a thin packaging material with a content contained therein.

Related Art

Conventionally, palletization of workpieces transported by a conveying device such as a conveyor may be performed by suction-gripping (suctioning and gripping) the workpieces. For example, in PTL 1, food products packed in bags are suction-gripped and transferred.

CITATION LIST

Patent Literature

[PTL 1] JP 2019-922 A

For suction-gripping a workpiece, a suction force sufficient to suction-grip the workpiece is required. The suction force is generated by suctioning air from a suction pad by using a pressure generating source such as a vacuum pump.

However, when the workpiece includes a relatively thin packaging material, such as polyethylene, vinyl chloride, cellophane, or paper, with a content contained therein, a suction force sufficient to suction-grip the workpiece may cause wrinkling in the packaging material. If wrinkles remain in the packaging material, the product having such wrinkles may be discarded even if the content itself is not defective. This may lead to an increase in product loss.

SUMMARY

In view of the above circumstances, a method of controlling a robot and a suction gripping device capable of preventing occurrence of wrinkling in a workpiece having a thin packaging material with a content therein are provided and contained.

Solution to Problem

According to a first exemplary embodiment, a method of controlling a robot configured to suction-grip a workpiece having a thin packaging material with a content contained therein includes: pressing a suction pad against the content with the packaging material interposed therebetween, and; upon starting the suction, suction-gripping the workpiece by the suction pad and transferring the workpiece.

In this configuration, it is preferred that suction be started in a state in which the suction pad is already pressed to the workpiece.

In the disclosure, the term "this packing material" is defined as being a film-like packaging material in which a content can be provided and contained. Such film-like packaging materials are made of, for example, polyethylene, vinyl chloride, cellophane, or paper.

Alternatively, from a viewpoint of causing wrinkles on a packaging material, the term "thin" means dependency on both the suctioning and gripping mechanical design of the suction pad and the thickness and strength of the packaging material. Hence, in the disclosure, the term "thin" can be defined as being, to one degree or more, fragile to a suction force provided in the system such that there is a possibility of some wrinkles which damage a surface of the packaging material occurring.

For suction-gripping a workpiece, a suction force sufficient to suction-grip the workpiece is required. In this process, the suction force is generated by suctioning air from the suction pad. However, even when air suction starts, there may be a slight time lag until a suction force sufficient to obtain a required suction-grip force is generated.

For this reason, in the conventional method, such a time lag is included in the movement time in which the suction pad is moved to pick up the workpiece, that is, suction starts at the stage when the suction pad is not yet in contact with the workpiece to thereby shorten the entire operation time.

In this case, since suction starts at the stage when the suction pad is not yet in contact with the workpiece, the thin packaging material may be pulled up by the force of air suction, which may cause wrinkling to occur. Further, since air suction continues from when the suction pad comes into contact with the workpiece until when the workpiece is placed, occurrence of wrinkling may remain until the workpiece is placed.

When wrinkles are formed or remain in the packaging material, the product having such wrinkles may be discarded even if the content itself is not defective. This may lead to an increase in food product loss.

Therefore, in the method of controlling the robot, suction starts in a state in which the suction pad is pressed already against the workpiece. Accordingly, since a suction force is not generated before the suction pad comes into contact with the workpiece, the packaging material is prevented from being pulled up, preventing occurrence of wrinkling. Since the workpiece is transferred while occurrence of wrinkling is suppressed, the possibility of wrinkles occurring or remaining in the packaging material can be reduced.

According to an example, the method includes flattening a surface of the packaging material by sliding the suction pad along a surface of the content when the suction pad is pressed against it. Accordingly, in the case where the packaging material initially does not have a flat surface, it is possible to flatten the surface of the packaging material when the workpiece is suction-gripped (suctioned and gripped) to thereby reduce the possibility of wrinkles occurring or remaining in the packaging material.

According to another example, the method includes flattening a surface of the packaging material by discharging air when the suction pad is pressed. Accordingly, in the case where the packaging material initially does not have a flat surface, it is possible to flatten the surface of the packaging material when the workpiece is suctioned and gripped to thereby reduce the possibility of wrinkles occurring or remaining in the packaging material.

According to another example, the method includes, upon placing the workpiece and stopping the suction, waiting for a predetermined period of time until a suction force disappears or sufficiently decreases before the suction pad is removed from the workpiece. If the suction pad is removed from the workpiece in a state in which a suction force is still being generated when the workpiece is placed, wrinkling may occur due to the remaining suction force. Therefore, after the workpiece is placed, the suction pad can be placed in a standby state until a suction force disappears or sufficiently decreases before the suction pad is removed from the workpiece to thereby reduce the possibility of wrinkles occurring or remaining in the packaging material.

According to still another example, the method includes discharging air from the suction pad when the workpiece is placed. Accordingly, even if some wrinkles are formed in the packaging material when the suction pad is pressed against it, the wrinkles can be eliminated by discharging air.

According to still another example, a suction gripping device configured to suction-grip a workpiece having a thin packaging material with a content provided and contained therein includes: a robot; a suction pad configured to be mounted on the robot and connected to a pressure generating source; and a controller that controls the robot. The controller is configured to: press the suction pad against the content with the packaging material interposed therebetween, the suction pad being connected to the pressure generating source; start suction by the pressure generating source in a state in which the suction pad is pressed; and suction-grip the workpiece by the suction pad upon starting the suction.

The suction gripping device having the above configuration can also achieve the same effects as those in the above control method, such as prevention of an increase in product loss in production of the workpieces having the thin packaging material with the content provided and contained therein.

By the way, in the foregoing first exemplary embodiment, it is still preferred that starting suction is performed before the suction pad has been pressed to the content of the workpiece. As long as the suction pad is tightly pressed to the content contained in the workpiece with the packaging material still between the suction pad and the content, it is possible to reduce wrinkles which may be caused on a surface of the packing material, through being on one level or another, compared with a case of starting suction in a state in which the suction pad is already pressed.

BRIEF DESCRIPTION OF DRAWINGS

In the accompanying drawings:

FIG. 3 is a chart of timing in a conventional control method as a comparative example:

DESCRIPTION OF THE EMBODIMENTS

With reference to the accompanying drawings, various embodiments and modifications will now be described.

First Embodiment

Figure 1:
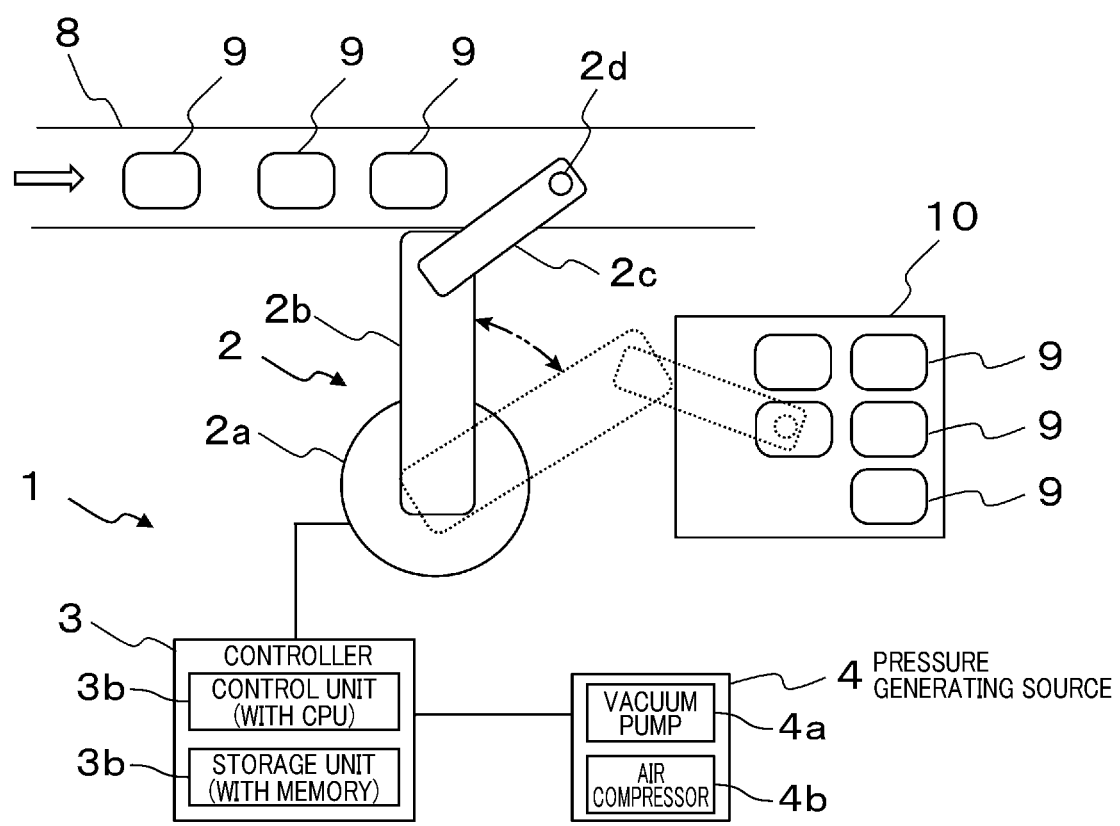
FIG. 1 is a diagram schematically illustrating an example configuration of a suction gripping device of an embodiment.

With reference to the drawings, an embodiment will be described. As shown in FIG. 1, a suction gripping device 1 according to the present embodiment includes an industrial robot 2, a controller 3, a pressure generating source 4, and the like. Although the suction gripping device 1 includes the industrial robot 2 in the present embodiment, the suction gripping device can be provided together with the industrial robot 2, in which the suction gripping device 1 includes the controller 3, the pressure generating source 4, but it does not always include the industrial robot 2.

In the present embodiment, the industrial robot 2 is described as a horizontal articulated 4-axis robot. It should be noted, however, that the industrial robot 2 may also be a vertical articulated 6-axis or 7-axis robot.

The industrial robot (simply, robot) 2 includes a base 2a installed on an installation surface, a first arm 2b rotatable about the base 2a, a second arm 2c rotatable relative to the first arm 2b, and a shaft 2d which is mounted on a distal end of the second arm 2c and vertically movable and rotatable relative to the second arm 2c. As shown in FIG. 2, a suction pad 5 is mounted on a distal end, that is, a lower end of the shaft 2d.

The suction pad 5 includes a pad portion 5a having a hollow tapered shape made of an elastic member and configured to directly come into contact with a workpiece 9, a bellows 5b having a hollow shape and joined to the pad portion 5a, a fixation portion 5c which is fixed to a fixation tool 6 to thereby fix the suction pad 5 to the robot 2, and a connecting section 5d to which an air tube 7 is connected. It should be noted that the above configuration of the suction pad 5 is merely an example, and other configurations that are common and well-known, including configurations having a rigid tube instead of the bellows 5b, can also be used.

The air tube 7 is connected to the suction pad 5 at one end and a pressure generating source 4 at the other end. The air tube 7, which has flexibility, can generally conform to a change in posture of the robot 2 while ensuring air flow passing therethrough even when the robot 2 bends as it changes the posture.

The pressure generating source 4 is configured to suction air from the suction pad 5 as indicated by the arrow F1, and discharge air toward the suction pad 5 as indicated by the arrow F2. For simplicity of description, the configuration is illustrated as having one pressure generating source 4. However, other configurations are possible, in which the pressure generating source 4 is composed of, for example, a vacuum pump 4a for suction and an air compressor 4b for discharge, and the air tube 7 is connected to the pressure generating source 4 via a branch valve. The air compressor 4b may not necessarily be provided if discharge of air is not performed.

The controller 3 controls the robot 2, timing of air suction from the pressure generating source 4 and the suction pad 5, and the like. As shown in FIG. 1, the controller 3 includes a control unit 3a composed of a microcomputer having a CPU, a ROM, a RAM, and the like (not shown), and a storage unit 3b composed of a semiconductor memory and the like. Although not shown, the controller 3 further includes an input/output circuit that transmits and receives data to and from external devices.

The controller 3 controls the posture of the robot 2, timing of suction and discharge of air from the pressure generating source 4 and the suction pad 5, and the like by executing computer programs stored in the storage unit 3b. In the present embodiment, it is assumed that the posture of the robot 2 is controlled by tracking, in which the robot 2 performs operation while following a change in position of the workpiece 9 transported by a conveying device 8. Accordingly, movement of the conveying device 8 is also controlled by the controller 3. Further, the posture of the robot 2 can also be controlled, for example, by using a camera to recognize the position of the workpiece 9, instead of by tracking.

Figure 2A:
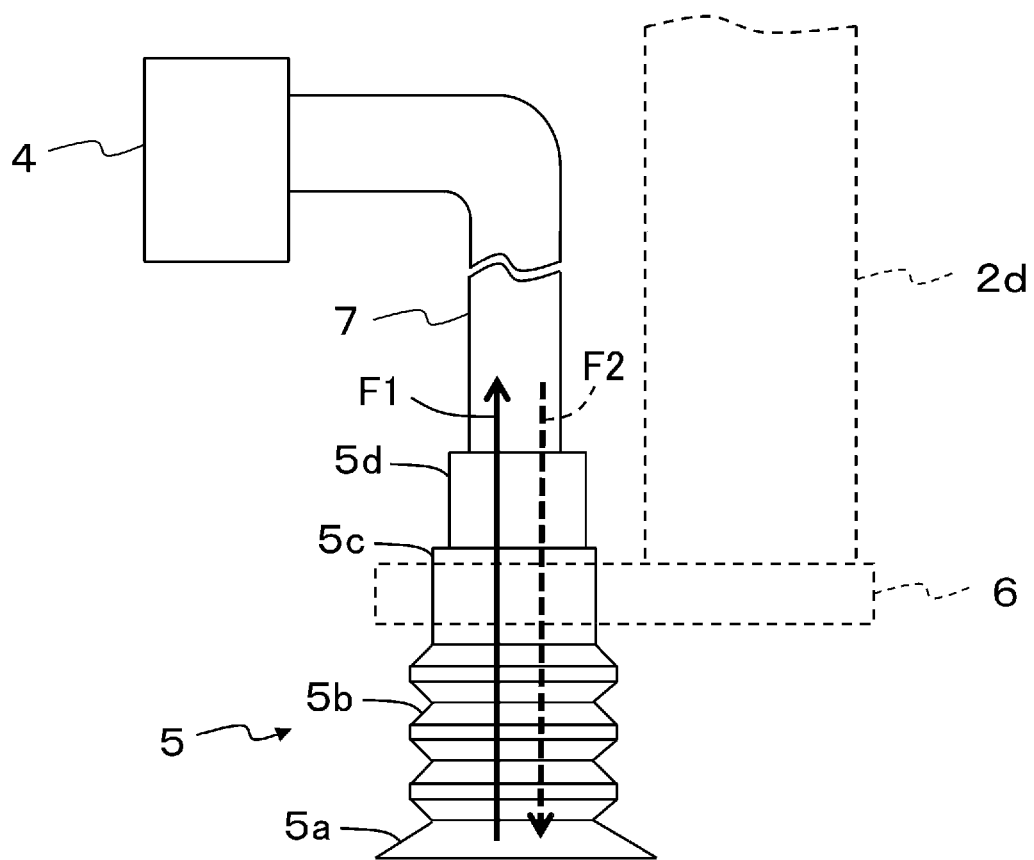
FIG. 2A is a diagram schematically illustrating a side face of the exemplified configuration of a suction pad.
Figure 2B:
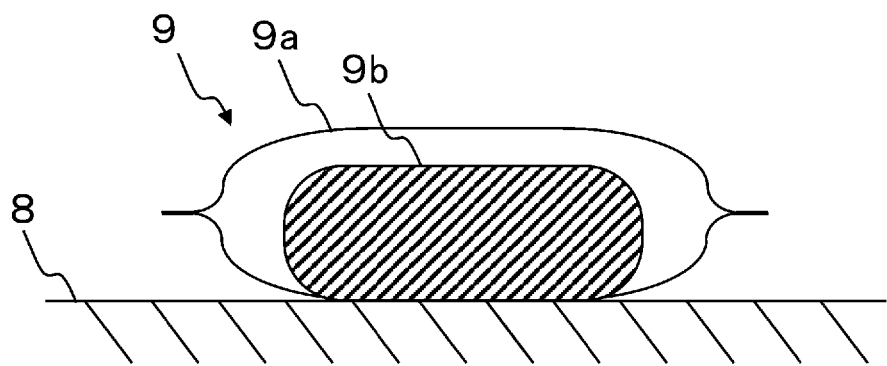
FIG. 2B is a sectional diagram showing a workpiece.

As shown in FIGS. 2A and 2B, it is assumed that the workpiece 9 in the present embodiment is an object having a film-like packaging material 9a with a content 9b provided and contained therein. The workpiece 9 is transported by the conveying device 8 such as a conveyor as shown in FIG. 1, and is picked up by the robot 2 and loaded in a pallet 10. The packaging material 9a may be, for example, a relatively thin material such as polyethylene, vinyl chloride, cellophane, or paper. Hereinafter, the packaging material 9a is also referred to as a film-like material.

Examples of the workpiece 9 include food products such as processed bread packed in thin-film packages such as plastic bags, for example, sweet red bean buns sold at supermarkets or convenience stores, and food products in which food is contained in a plastic container, which is in turn packed in the packaging material 9a. The workpiece 9 should not be limited to food products, and may be other than food products.

The content 9b is assumed to be an elastically deformable object such as a sweet red bean bun described above, that is, an object that deforms when the suction pad 5 is pressed against it but recovers from the deformation when the suction pad 5 is removed from it. Alternatively, the content 9b may be an object that does not elastically deform or slightly deforms such as a plastic container described above, that is, an object that does not substantially deform even when the suction pad 5 is pressed against it. In other words, even when the suction pad 5 is pressed against the workpiece 9, the workpiece 9 is not affected in appearance and quality when it is placed.

Further, the workpiece 9 in the present embodiment is assumed to be an object in which a certain space is formed between the packaging material 9a and the content 9b in a state where no external force is applied, and the packaging material 9a is deformed or displaced to abut the content 9b when the suction pad 5 is pressed against the workpiece 9. In other words, an object such as a bag filled with liquid is not included in the assumed workpiece 9. However, a bag filled with liquid, which is in turn packed in the packaging material 9a, may be used as the assumed workpiece 9 of the present embodiment.

Next, effects of the above configuration will be described. For suction-gripping the workpiece 9, a suction force sufficient to suction-grip the workpiece 9 is required. However, when a suction force sufficient to suction-grip the workpiece 9 is generated by suctioning air from the suction pad 5, for example, by using the vacuum pump 4a, wrinkling may occur in the packaging material 9a.

It is considered that such wrinkles are likely to be formed during suction-gripping or remain after suction-gripping due to factors other than the material of the packaging material 9a. Specifically, it is considered that wrinkles are likely to be formed or remain due to the control method for suction-gripping the workpiece 9.

As shown in a comparative example shown in FIG. 3, specifically, the suction pad 5 located at an initial position starts moving at a time Ts, comes into contact with the workpiece 9 to pick it up at a time Tx, completes placement of the workpiece 9 at a time Ty, and returns to the initial position at a time Te. That is, a period from the time Ts to the time Te corresponds to one cycle of an operation time CT0.

In a conventional suction-gripping method, air suction starts at a stage when the suction pad 5 is not yet in contact with the workpiece 9. That is, a time Ton at which air suction starts is before the time Tx. The reason for this is that, since it is assumed that a slight time lag $\Delta t0$ occurs from when suction starts to when a required suction force is obtained, such a time lag is included in a movement time $\Delta t1$ in which the suction pad 5 moves in order to shorten the entire operation time CT0. Further, in FIG. 3, a time Toff is equal to the time Ty since the suction is stopped at the time Ty at which the workpiece 9 is placed.

Figure 4:
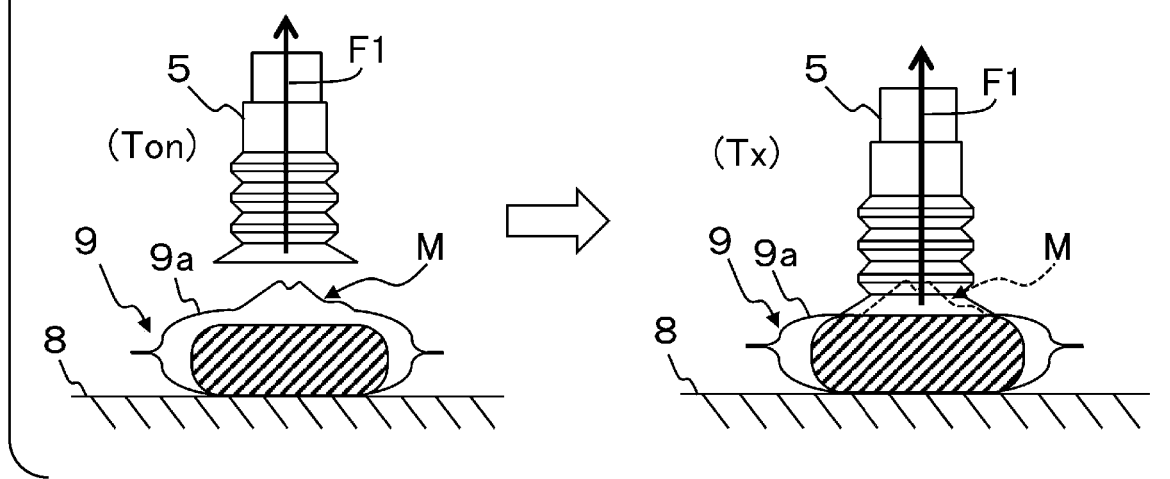
FIG. 4 is a diagram schematically illustrating a suction mode in a conventional control method as a comparative example.

According to such a conventional control method, as shown in FIG. 4, suction starts at the time Ton at which the suction pad 5 is not yet in contact with the workpiece 9. Accordingly, the film-like packaging material 9a, which is thin and relatively soft, is pulled up by the suction force due to air suction, which causes wrinkles (M) to be formed. In the present embodiment, the wrinkles (M) are not limited to creases, but may also include unevenness of a surface of the packaging material 9a.

Since air suction still continues at the time Tx, at which the suction pad 5 comes into contact with the workpiece 9, the workpiece 9 is picked up with the wrinkles being formed. Further, since air suction continues until the workpiece 9 is placed, occurrence of wrinkling may continue until the workpiece 9 is placed. When wrinkles are formed or remain in the packaging material 9a, the product having such wrinkles may be discarded even if the content 9b itself is not defective. This may lead to an increase in food product loss.

Figure 5:
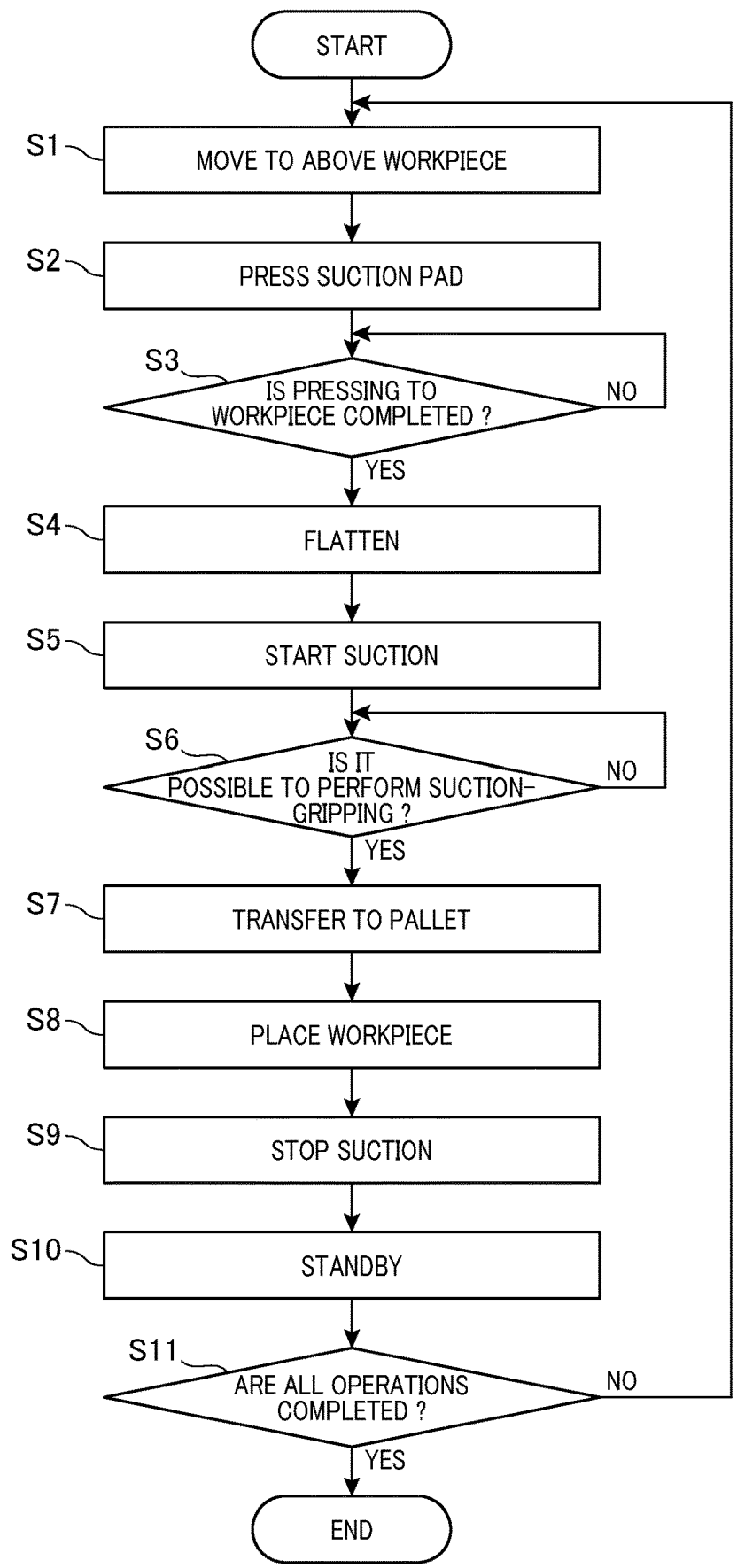
FIG. 5 is a flowchart showing a procedure for suction-gripping a workpiece in the first embodiment.

Therefore, the suction gripping device 1 performs a procedure shown in FIG. 5, that is, a control method shown in FIG. 5, in order to suppress an increase in product loss in production of the workpieces 9 having the film-like packaging material 9a with the content 9b contained therein. Although the procedure shown in FIG. 5 is basically executed by the controller 3, the following description will be given as the procedure being performed by the suction gripping device 1 for ease of understanding.

In step S1, the suction gripping device 1 moves the suction pad 5 to a position above the workpiece 9, and in step S2, causes the suction pad 5 to be pressed tightly against the workpiece 9. As shown in an example shown in FIG. 6, and as shown in S1 and S2 in FIG. 7, suction from the suction pad 5 is not yet performed during a period from a time Ts, at which the suction pad 5 starts moving, to a time Tx, at which the suction pad 5 is pressed against the workpiece 9.

Then, in step S3, the suction gripping device 1 determines whether tight pressing of the suction pad 5 is completed. In this step, the suction gripping device 1 determines whether tight pressing of the suction pad 5 is completed, for example, based on whether the lower end of the suction pad 5 reaches a predetermined height H1 from a placement surface of the conveying device 8.

It is assumed that the contents 9b of the workpieces 9 are manufactured in an identical size. Accordingly, when the lower end of the suction pad 5 reaches the predetermined height H1, the suction pad 5 is considered to be pressed against the content 9b with the packaging material 9a interposed therebetween. Further, it is also possible to provide a sensor for detecting an external force and determine that pressing of the suction pad 5 is completed when the external force applied to the suction pad 5 reaches a predetermined value, or to provide a sensor for detecting a height from the placement surface and determine that pressing of the suction pad 5 is completed when the suction pad 5 reaches a predetermined height from the placement surface.

Once it is determined that pressing of the suction pad 5 is completed, the suction gripping device 1 performs flattening of the packaging material 9a in step S4. For example, as shown in S1 and S2 in FIG. 7, there may be a case where wrinkles (M) are formed in the packaging material 9a. In this case, if suction is applied to the workpieces 9 as it is, wrinkles may remain. Therefore, the suction gripping device 1 slides the suction pad 5 along a surface of the content 9b, for example, in the horizontal direction in the figure, to flatten the surface of the packaging material 9a to thereby reduce or remove the wrinkles. A period of time required for the flattening corresponds to Δt10 in FIG. 6. When no flattening is performed, Δt10 is 0.

Figure 6:
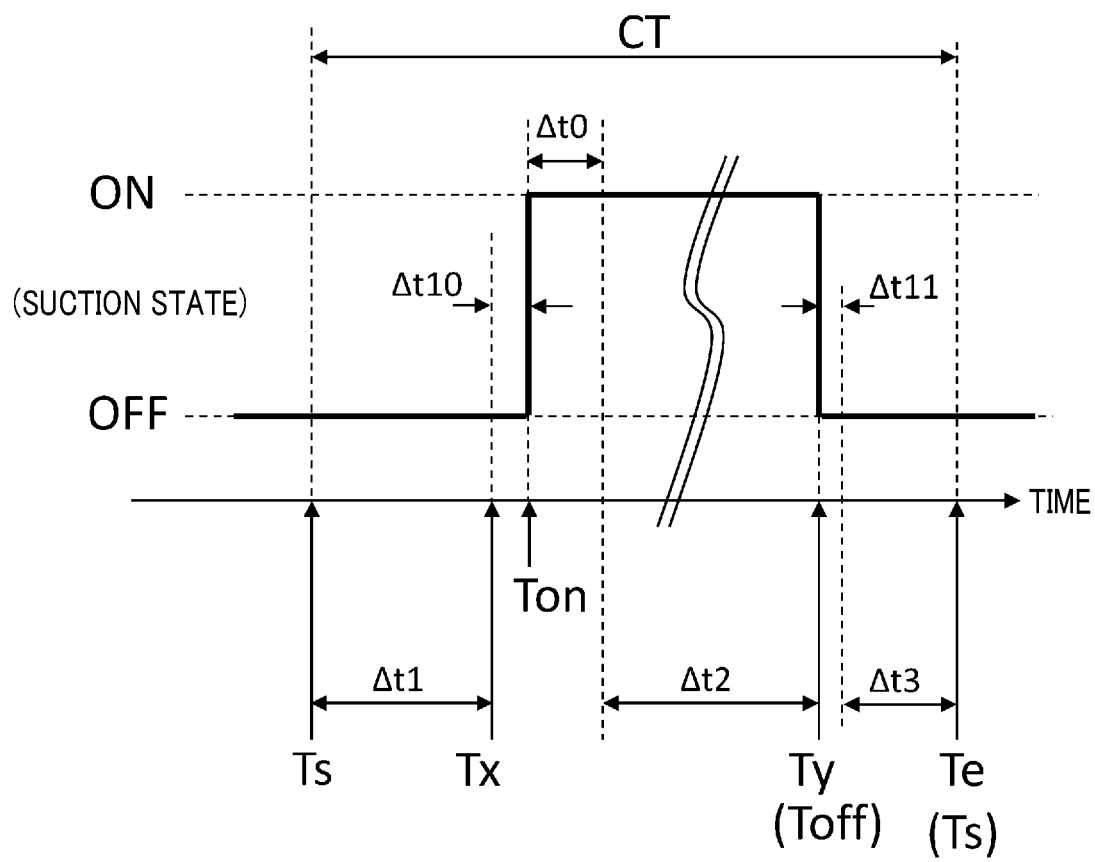
FIG. 6 is a chart of timing.
Figure 7:
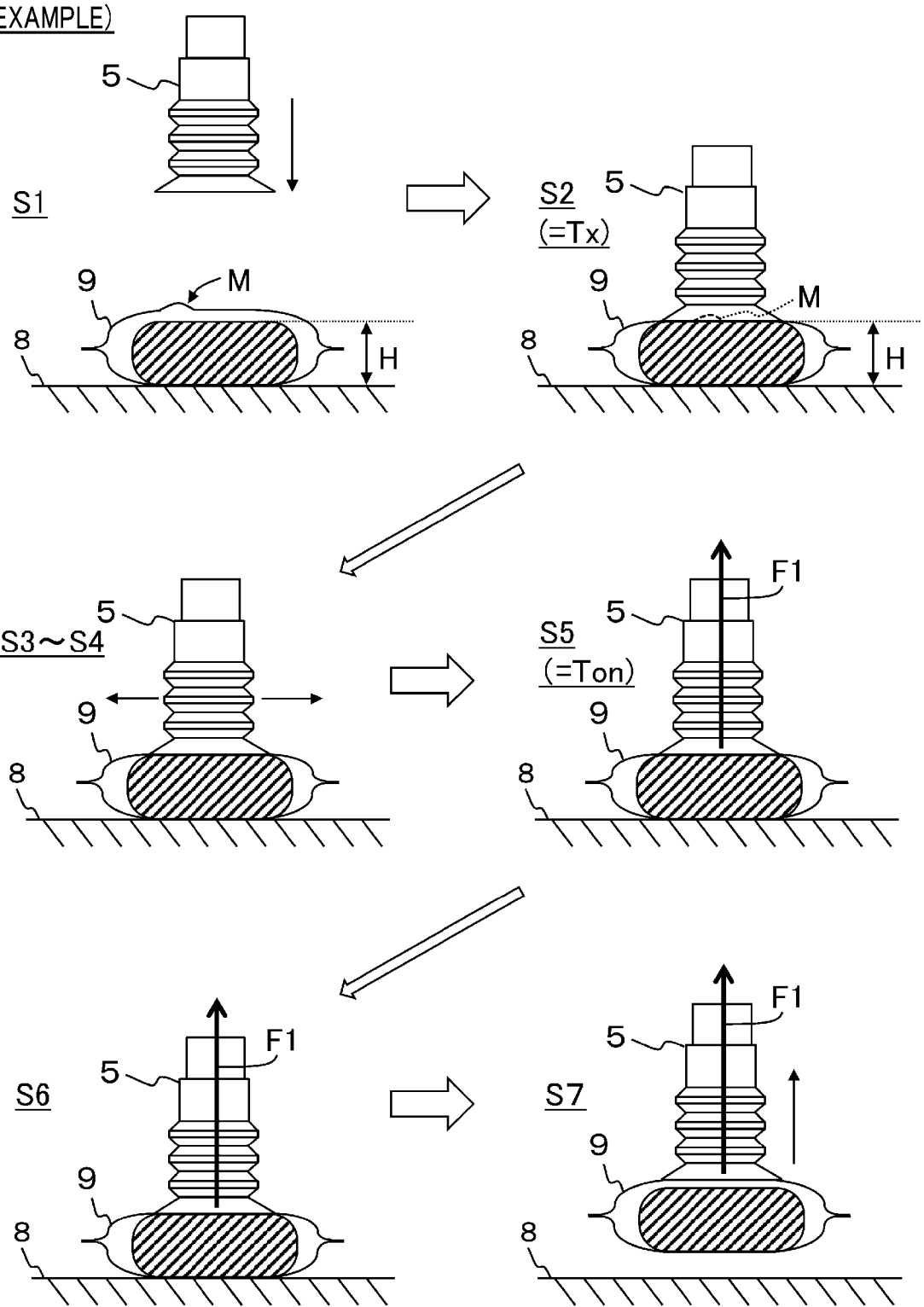
FIG. 7 is a diagram schematically illustrating a suction mode in the first embodiment.

Once the flattening is completed, the suction gripping device 1 starts air suction from the suction pad 5 as indicated by the arrow F1 in step S5. That is, as shown in FIG. 6, and as shown in S5 in FIG. 7, the suction gripping device 1 starts air suction from the suction pad 5 at a time Ton, which is after the time Tx at which the suction pad 5 has been pressed against the workpiece 9. Accordingly, deformation of the packaging material 9a due to suction, such as one described above referring to FIG. 4, can be prevented.

Then, in step S6, the suction gripping device 1 determines whether it is possible to perform suction-gripping. That is, in step S6, the suction gripping device 1 determines whether a suction force sufficient to suction-grip the workpiece 9 has been obtained. In the present embodiment, it is assumed that a suction force sufficient to suction-grip the workpiece 9 is obtained when a period of time Δt0 elapses after the start of suction. Therefore, when Δt0 has not elapsed after the time Tx, the suction gripping device 1 determines that it is not possible to perform suction-gripping (NO in step S6), and continues suction.

On the other hand, when Δt0 has elapsed after the time Tx, the suction gripping device 1 determines that it is possible to perform suction-gripping (YES in step S6), and suction-grips the workpiece 9 and transfers it to the pallet 10 in step S7. Then, when the placement of the workpiece 9 is completed in step S8, the suction gripping device 1 stops suction in step S9 and enters a standby state in step S10.

As shown in FIG. 6, the suction gripping device 1 places the workpiece 9 at a time Ty and stops suction at a time Toff, and then waits for a period of Δt11 in a state in which the suction pad 5 is in contact with the workpiece 9. The reason for this is that, if a suction force is generated in a state in which the suction pad 5 is removed from the workpiece 9 when the workpiece 9 is placed and the suction pad 5 is removed from the workpiece 9, wrinkling may occur in the packaging material 9a as described above referring to FIG. 4.

Therefore, the suction gripping device 1 prevents a suction force from being generated in a state in which the suction pad 5 is removed from the workpiece 9 not only when it starts suction-gripping the workpiece 9, but also when it stops suction-gripping the workpiece 9. However, it is assumed that Δt11 varies depending on the specification of the pressure generating source 4, the configuration of a valve that generates a suction force, the generated suction force, and the like. Accordingly, a preliminary test can be performed in advance to pre-set an appropriate value for Δt11. If the suction force is configured to almost disappear simultaneously with stopping the suction, Δt11 can be set to zero or an extremely short period of time.

Then, in step S11, when the suction gripping device 1 determines that all the operations are completed, for example, when all the workpieces 9 have been transferred to the pallet 10 (YES in step S11), the process ends.

On the other hand, when the suction gripping device 1 determines that the operations are not completed, for example, when any workpiece 9 to be transferred to the pallet 10 is left on the conveying device 8 (NO in step S11), the process returns to step S1. In the present embodiment, as shown in FIG. 6, a time Te at which the workpiece 9 has been transferred to the initial position corresponds to a time Ts at which the operation for the next workpiece 9 starts.

In this case, the operation time CT in the present embodiment is longer than the conventional operation time CT0 by at least Δt10, and may be further longer when the flattening time (Δt10) and the standby time (Δt11) are added. As such, the present embodiment intentionally increases the operation time in order to prevent occurrence of wrinkling in the packaging material 9a. In other words, the suction gripping device 1 and the control method for suction-gripping the workpiece 9 according to the present embodiment are based on the technical idea that the priority is given to the quality of the workpiece 9 over the shortening of operation time.

According to the embodiment described above, the following advantageous effects can be obtained. The method of controlling the robot 2 of the above embodiment, configured to suction-grip the workpiece 9 having the film-like packaging material 9a with the content 9b contained therein, includes: pressing the suction pad 5 against the content 9b with the packaging material 9a interposed therebetween; starting suction in a state in which the suction pad 5 is pressed; and, upon starting the suction, suction-gripping the workpiece 9 by the suction pad 5.

For suction-gripping the workpiece 9, a suction force sufficient to suction-grip the workpiece 9 is required. In this process, the suction force is generated by suctioning air from the suction pad 5. However, even when air suction starts, there may be a slight time lag until a suction force sufficient to obtain a required suction-grip force is generated.

For this reason, in the conventional method, such a time lag is included in the movement time in which the suction pad 5 is moved to pick up the workpiece 9, that is, suction starts at the stage when the suction pad 5 is not yet in contact with the workpiece 9 to thereby shorten the entire operation time.

In this case, since suction starts at the stage when the suction pad 5 is not yet in contact with the workpiece 9, the film-like packaging material 9a may be pulled up by the force of air suction, which may cause wrinkling to occur. Further, since air suction continues from when the suction pad 5 comes into contact with the workpiece 9 until when the workpiece 9 is placed, occurrence of wrinkling may remain until the workpiece 9 is placed.

When wrinkles are formed or remain in the packaging material 9a, the product having such wrinkles may be discarded even if the content 9b itself is not defective. This may lead to an increase in food product loss.

Therefore, in the method of controlling the robot 2, suction starts in a state in which the suction pad 5 is pressed against the workpiece 9. Accordingly, since a suction force is not generated before the suction pad 5 comes into contact with the workpiece 9, the packaging material 9a is prevented from being pulled up, preventing occurrence of wrinkling. Since the workpiece 9 is transferred while occurrence of wrinkling is suppressed, the possibility of wrinkles occurring or remaining in the packaging material 9a can be reduced.

Further, the method of controlling the robot 2 of the above embodiment includes flattening a surface of the packaging material 9a by sliding the suction pad 5 along a surface of the content 9b when the suction pad is pressed. Accordingly, in the case where the packaging material 9a initially does not have a flat surface, it is possible to flatten the surface of the packaging material 9a when the workpiece 9 is suction-gripped to thereby reduce the possibility of wrinkles occurring or remaining in the packaging material 9a.

Further, the method of controlling the robot 2 of the above embodiment includes, upon placing the workpiece 9 and stopping the suction, waiting for a predetermined period of time before the suction pad 5 is removed from the workpiece 9. If a suction force is generated in a state in which the suction pad 5 is removed from the workpiece 9 when the workpiece 9 is placed and suction is stopped, wrinkling may occur. Therefore, after the workpiece 9 placed, the suction pad 5 can be placed on a standby state until a suction force disappears or sufficiently decreases before the suction pad 5 is removed from the workpiece 9 to thereby reduce the possibility of wrinkles occurring or remaining in the packaging material 9a.

Further, the suction gripping device 1 of the above embodiment, configured to suction-grip the workpiece 9 having the film-like packaging material 9a with the content 9b contained therein, includes: the robot 2; the suction pad 5 configured to be mounted on the robot 2 and connected to the pressure generating source 4; and the controller 3 that controls the robot 2. The controller 3 is configured to: press the suction pad 5 against the content 9b with the packaging material 9a interposed therebetween, the suction pad 5 being connected to the pressure generating source 4; start suction by the pressure generating source 4 in a state in which the suction pad 5 is pressed; and suction-grip the workpiece 9 by the suction pad 5 upon starting the suction.

The suction gripping device 1 having the above configuration can also achieve the same effects as those in the above control method, such as prevention of an increase in product loss in production of the workpieces 9 having the film-like packaging material 9a with the content 9b provided and contained therein.

Although the example described in the above embodiment includes both the flattening step and the standby step, the control method may not necessarily include either or both of the steps.

In the example described in the above embodiment, a surface of the packaging material 9a is flattened by sliding the suction pad 5 along the surface. However, it is also possible to include a step of flattening a surface of the packaging material 9a by discharging air when the suction pad 5 is pressed. For example, as shown in a flattening mode 1 in FIG. 8, the wrinkles (M) on a surface of the packaging material 9a can be flattened by discharging air after the suction pad 5 is pressed.

Further, flattening a surface of the packaging material 9a can also be performed by discharging air when the workpiece 9 is placed. Accordingly, even if some wrinkles are formed in the packaging material 9a when the suction pad 5 is pressed against it, the wrinkles can be eliminated by discharging air.

Figure 8:
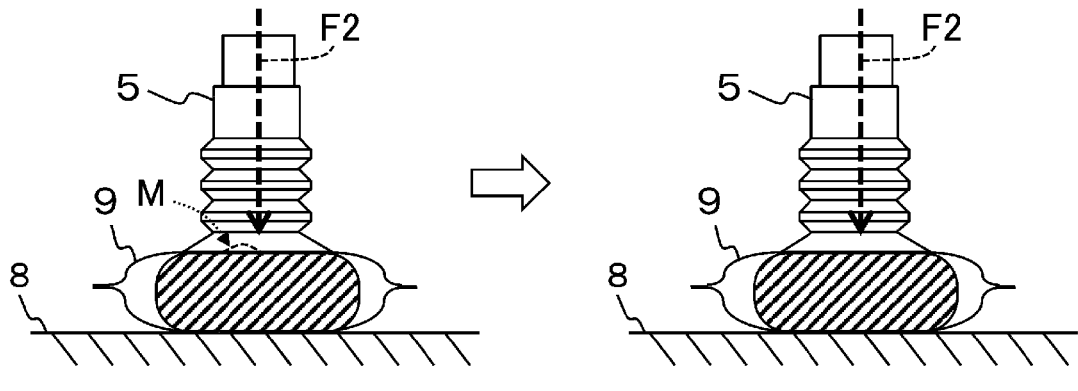
FIG. 8 is a diagram schematically illustrating another flattening mode.
Figure 9:
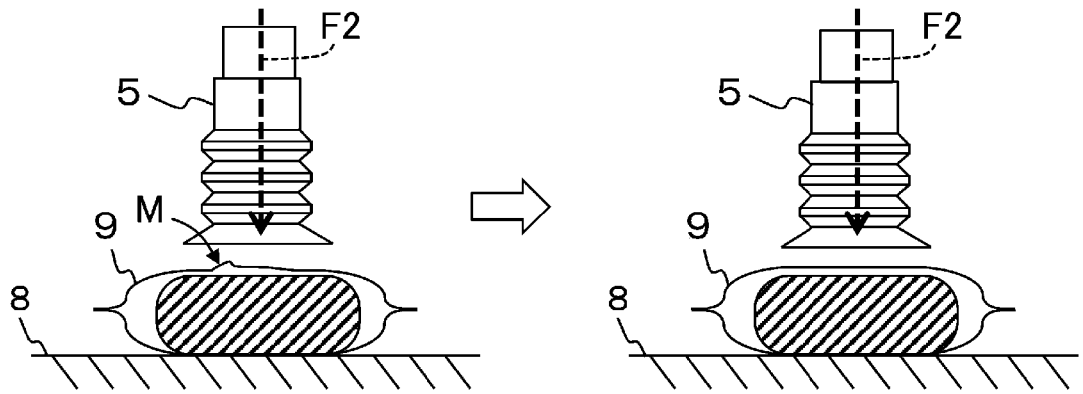
FIG. 9 is a diagram schematically illustrating another flattening mode.

Alternatively, as shown in a flattening mode 2 in FIG. 8, the wrinkles (M) on a surface of the packaging material 9a can be flattened by discharging air before the suction pad 5 is pressed. With this configuration, it is also possible to flatten the surface of the packaging material 9a when the workpiece 9 is suctioned and gripped to thereby reduce the possibility of wrinkles occurring or remaining in the packaging material 9a.

Second Embodiment

Figure 10:
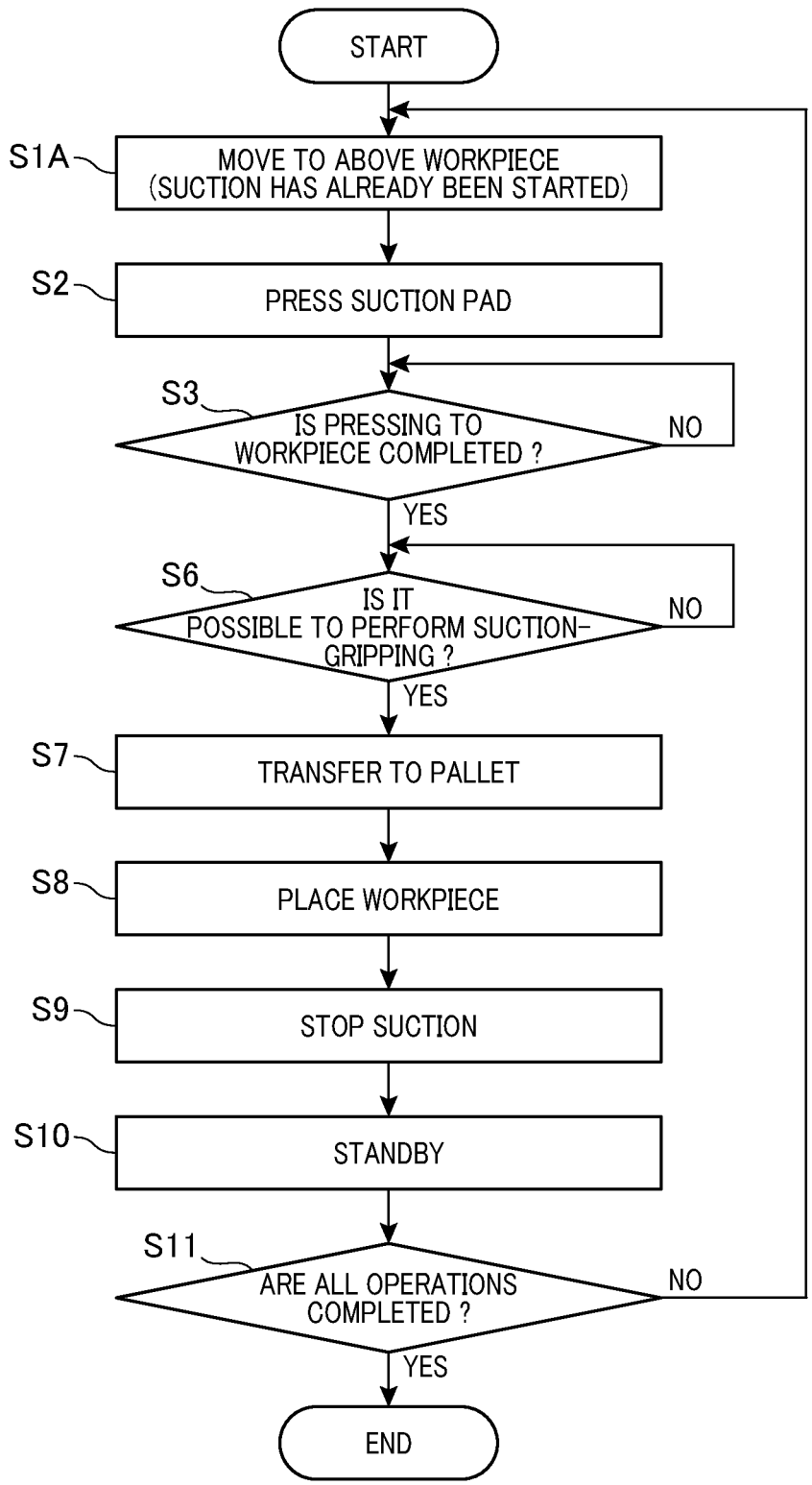
FIG. 10 is a flowchart showing a procedure for suction-gripping a workpiece in a second embodiment.
Figure 11:
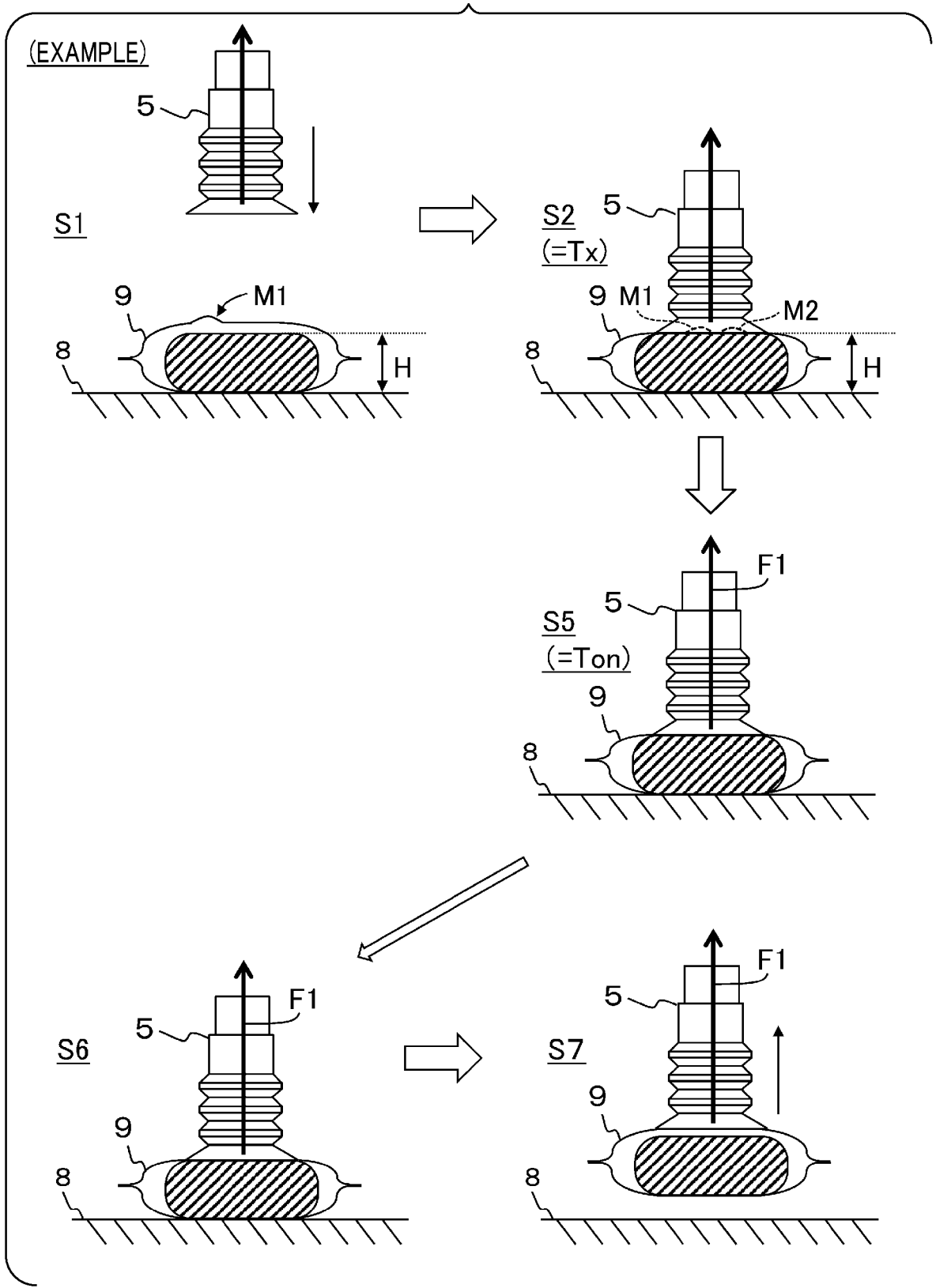
FIG. 11 is a diagram schematically illustrating a suction mode in the second embodiment.

With reference to FIGS. 10 and 11, a second embodiment of the method and device according to the present disclosure will now be described. In this embodiment, components which have functions and/or structures similar or equivalent to those explained in the first embodiment will be denoted by the same reference numerals for the purpose of a simplified explanation.

In the second embodiment, the control unit 3b (i.e., CPU provided therein) of the controller 3 is configured to read a predetermined program for controlling robot's workpiece suctioning/gripping actions from the storage unit 3b, which is outlined in FIG. 10. Then the control unit 3b is configured to perform the steps provided in the program in sequence. As a result, advantageous operations illustrated in FIG. 11 can be provided.

Specifically, in the suction gripping device 1 of the second embodiment, the priority is given to shortening of a period of time required for the robot 2 from its start of the suctioning and gripping operations to its completion. The control unit 3b performs the processing of steps S1A, S2, S3, S6-S11 of FIG. 10, like those already described in the first embodiment. In FIG. 10, steps S4 and S5 are removed, which were provided in FIG. 5. In addition, the step S1A allows the suction pad 5, i.e., the robot arm, to move above the workpiece 9, but at this timing, the vacuum pump 4a has already been activated, that is, the suction has already been started. Then, the steps S2, S3, S6-S11 are followed in the same manner as described in the first embodiment.

Hence, when the suction pad 5 is tightly pressed onto the workpiece 9 with the packing material 9a still intervening between the suction pad 5 and the workpiece 9, the suction has already been performed. In this case, although some wrinkles M1 and M2 may be caused newly or additionally on the packing material 9a as shown in FIG. 11 (see step S2), a degree of causing the wrinkles can still be reduced when the suction pad 5 is quickly and tightly pressed onto the packaging material 9a and content 9b (i.e., the workpiece 9). Of course, depending on how the already-activated suction pad 5 is moved toward the workpiece 9 (i.e., how to design the operations of the suction pad 5), the possibility of causing wrinkles on the packing material 9a can still be reduced during the approach of the suction pad 5 (steps S1 and S2 in FIG. 11) and the gripping and delivering process (steps S5, S6 and S7 in FIG. 11), thus still being effective for reducing such wrinkles from occurring. This is largely due to the fact that the suction pad 5 is pressed tightly to the content 9b with the packing material 9a still placed tightly between the suction pad 5 and content 9b.

Hence it is possible to speed up the robot suction and gripping operations, and the wrinkles may still be reduced.

Of course, in the second embodiment, it is sufficient that the suction pad 5 is activated during the movement of the suction pad 5 toward the workpiece 9, before reaching thereto.

In the examples described in the above embodiment, one content 9b is packed. However, in the workpiece 9, a plurality of contents 9b may also be packed in the packaging material 9a. When a plurality of contents 9b are packed, the suction pad 5 can be configured to be pressed against a relatively large content 9b with the packing material 9a therebetween. In this case, the content 9b larger than a suction surface of the suction pad 5 can be preferentially selected as a target of pressing. Accordingly, it is possible to reduce the possibility of wrinkles being formed due to unevenness or the like when the suction pad 5 is pressed.

In the example described in the above embodiment, a single suction pad 5 is provided in the robot 2. However, a plurality of suction pads 5 can also be provided in the robot 2 by using a fixation tool 6 that can mount a plurality of suction pads 5.

In the example described in the above embodiment, the pressure generating source 4 that can perform air suction and discharge is used. However, when the air discharge step is not necessary, the pressure generating source 4 can be composed of only the vacuum pump 4a that can perform air suction.

The aforementioned configurations are merely illustrative and should not be construed to limit the technical scope of the present invention. Various modifications and combinations can be made without departing from the scope of the present invention, and these modifications and combinations should be included in the equivalent scope.

PARTIAL REFERENCE SIGNS LIST

Throughout the drawings, reference numeral 1 denotes a suction gripping device, reference numeral 2 denotes a robot, reference numeral 3 denotes a controller, reference numeral 4 denotes a pressure generating source, reference numeral 5 denotes a suction pad, reference numeral 9 denotes a workpiece, reference numeral 9a denotes a packaging material, and reference numeral 9b denotes a content.

What is claimed is:

1. A method of controlling a robot configured to air-suction and grip a workpiece to transfer the workpiece from one position to a further position, the workpiece being a content packed by a thin-film packaging material, and a space being formed inside the packaging material between the content and the packaging material itself, the method comprising:

pressing, at the one position, a suction pad tightly to the workpiece such that (i) the suction pad is pressed tightly to the content with the packaging material interposed between the suction pad and the content on a pressed surface of the packaging material and (ii) the content of the workpiece is gripped by the air-suction of the suction pad in a state where the packaging material is interposed between the suction pad and the content;

flattening the pressed surface of the packaging material by sliding the suction pad along a pressed surface of the content to which the suction pad has been pressed via the packaging material;

starting the air-suction of the suction pad when the suction pad has been pressed to the content of the workpiece; and transferring the workpiece by the suction pad to the further position.

2. The method of controlling a robot according to claim 1, the method comprising flattening the pressed surface of the packaging material by discharging air to the pressed surface.

3. The method of controlling a robot according to claim 1, the method comprising, upon placing the workpiece and stopping the air-suction, waiting for a predetermined period of time until a suction force of the suction pad disappears or sufficiently decreases before the suction pad is removed from the workpiece.

4. The method of controlling a robot according to claim 1, the method comprising discharging air from the suction pad when the workpiece is placed.

5. A method of controlling a robot configured to air-suction and grip a workpiece to transfer the workpiece from one position to a further position, the workpiece being a content packed by a thin-film packaging material, and a space being formed inside the packaging material between the content and the packaging material itself, the method comprising:

pressing, at the one position, a suction pad tightly to the workpiece such that (i) the suction pad is pressed tightly to the content with the packaging material interposed between the suction pad and the content on a pressed surface of the packaging material and (ii) the content of the workpiece is gripped by the air-suction of the suction pad in a state where the packaging material is interposed between the suction pad and the content;

flattening the pressed surface of the packaging material by discharging air to the pressed surface when the suction pad is about to be pressed via the packaging material;

starting the air-suction of the suction pad when the suction pad has been pressed to the content of the workpiece; and transferring the workpiece by the suction pad to the further position.

6. The method of controlling a robot according to claim 5, the method comprising, upon placing the workpiece and stopping the air-suction, waiting for a predetermined period of time until a suction force of the suction pad disappears or sufficiently decreases before the suction pad is removed from the workpiece.

7. The method of controlling a robot according to claim 5, the method comprising discharging air from the suction pad when the workpiece is placed.

* * * * *